United States Patent

Bowerman

[11] Patent Number: 5,554,081
[45] Date of Patent: Sep. 10, 1996

[54] DIFFERENTIAL WITH DISTRIBUTED PLANET GEARS

[75] Inventor: Ward E. Bowerman, Rochester, N.Y.

[73] Assignee: Zexel Torsen Inc., Rochester, N.Y.

[21] Appl. No.: 400,809

[22] Filed: Mar. 8, 1995

[51] Int. Cl.[6] .................................................. F16H 48/10
[52] U.S. Cl. ......................................... 475/252; 74/665 GD
[58] Field of Search ....................................... 475/248, 249, 475/250, 252, 258; 74/665 GA, 665 GD

[56] References Cited

U.S. PATENT DOCUMENTS

| | | |
|---|---|---|
| 2,269,734 | 1/1942 | Powell . |
| 3,706,239 | 12/1972 | Myers . |
| 4,365,524 | 12/1982 | Dissett et al. . |
| 5,055,096 | 10/1991 | Riemscheid et al. ..................... 475/249 |
| 5,122,101 | 6/1992 | Tseng ....................................... 475/252 |
| 5,122,102 | 6/1992 | Chludek et al. .......................... 475/252 |
| 5,221,238 | 6/1993 | Bawks et al. ............................. 475/252 |
| 5,292,291 | 3/1994 | Ostertag ................................... 475/252 |
| 5,389,048 | 2/1995 | Carlson .................................... 475/252 |

FOREIGN PATENT DOCUMENTS 4023332  3/1992  Germany .

*Primary Examiner*—Charles A. Marmor
*Assistant Examiner*—Sherry Lynn Estremsky
*Attorney, Agent, or Firm*—Eugene Stephens & Associates

[57] ABSTRACT

A parallel-axis torque-proportioning differential includes four sets of planetary gear pairs mounted within a differential housing having exterior dimensions substantially identical to those presently being used for comparable prior art designs. The four planetary pairs are arranged in two planetary sets positioned symmetrically-but-non-equiangularly with the axes of the planet gears in a mirror-image relationship about the common axis of the sun/side gears and with each planetary set comprising two of the separate and distinct planet gear pairs. The two planetary sets are separated from each other by large angular spacings; and two large windows, which are positioned in circumferential alignment with each of said large angular spacings, facilitate lubrication and also provide appropriate access to accommodate C-clip assembly.

19 Claims, 5 Drawing Sheets

5,554,081

DIFFERENTIAL WITH DISTRIBUTED PLANET GEARS

TECHNICAL FIELD

The invention relates to torque-proportioning type automotive differentials having planetary gear arrangements carried within housings that are rotatable about a pair of drive axles interconnected by the planetary gear arrangements.

BACKGROUND OF INVENTION

Gear differentials generally include compound planetary gear sets interconnecting a pair of drive axles to permit the latter to rotate in opposite directions with respect to a differential housing. The drive axles rotate about a common axis; and a pair of respective side gears (sometimes called "sun" gears) are fixed for rotation with the inner ends of the two drive axles, such side gears acting as the sun gear members of the compound planetary gear sets. The side gears are interconnected by planet gears sometimes called "element" or "combination" gears. The planet gears are usually arranged as sets of meshing pairs, being spaced circumferentially and equidistant about the common axis of the sun gears (e.g., four pairs arranged at 90° intervals or three pairs at 120° intervals); and the planet gears may be mounted for rotation about axes that are variously offset and inclined with respect to a common axis of the sun gears and drive shafts. My invention relates primarily to "parallel-axis" differentials in which the planet gears are mounted on axes parallel to the common axis of the sun gears.

The entire planetary gearing arrangement within the differential housing supports opposite relative rotation between the drive axle ends (i.e., differentiation), which is necessary to permit the axle ends to be driven at different speeds. Torque transmitted to the drive axles through the inclined tooth surfaces of the sun/side gears generates thrust forces against gear-mounting bearing surfaces within the differential. (Such bearing surfaces may comprise journals formed in the housing, or may be the bores or the ends of the bores into which the gears are received, or may be special washers positioned between the end faces or shaft ends of the gears and the housing.) The thrust forces, together with other loads conveyed by the gear meshes in the planetary gearing, produce a frictional resistance to relative rotation between the drive axles, this frictional resistance being proportional to the torque applied to the differential housing. The proportional frictional resistance supports different amounts of torque between the two drive axles to prevent their relative rotation until the characteristic "bias" ratio of the planetary gearing arrangement is reached. Once the frictional resistance is overcome and differentiation begins, the torque difference between the axles is proportioned in accordance with the bias ratio. Differentials that divide torque in a substantially constant ratio between relatively rotating drive axles are referred to as "torque-proportioning" differentials.

The ability to support different amounts of torque between the drive axles is of great benefit to improving traction capabilities of vehicles. Ordinarily, when one wheel of a vehicle with a conventional differential loses traction, the amount of torque that can be delivered to the other drive wheel is similarly reduced. However, when one wheel of a torque-proportioning differential loses traction, an increased amount of torque is delivered to the drive wheel having better traction, such increased torque being determined by the characteristic bias ratio of the differential.

In typical parallel-axis torque-proportioning differentials (e.g., U.S. Pat. Nos. 2,269,734 to L. S. Powell and 3,706,239 to A. F. Myers), each planet gear is in mesh with a paired planet gear; each planet gear in the pair meshes, respectively, with one of the sun gears; and one axial end of each individual planet gear is in mesh with its respective side gear, while its other axial end is in mesh with its paired planet gear. This common form of planetary gearing is appropriate for some embodiments of my invention, but preferred embodiments utilize unusually shaped planet gear pairs which are referred to as "straddle" gears. These preferred straddle planet gears mesh with each other at two or three separated engagement areas, and two of these engagement areas on each planet gear straddle the portion of the gear which is in mesh with its respective side gear. (See U.S. Pat. No. 5,122,101 to G. B. Tseng and my U.S. patent application Ser. No. 327,027, filed 2 Oct. 1994.)

In regard to one of the features of the invention, a significant portion of automobiles presently being manufactured throughout the world use so-called "C-clips" for assuring that the axle ends cannot be accidentally withdrawn from the differential (see U.S. Pat. No. 4,365,524 issued to Dissett et al.). In this well-known type of assembly, C-shaped (i.e., partial ring)fasteners are fitted within annular grooves formed near the axle ends after the latter have been inserted through respective journals formed in the differential housing and through a respective one of the sun/side gears.

In order to complete this C-clip assembly, it is necessary to provide space for some relative motion between each axle end and the differential housing so that each axle end can be inserted within the differential case for a sufficient distance to expose the locking ring groove formed in the axle end. Once the C-clip locking ring is installed in place, the axle part is then withdrawn to a desired position for normal driving operation. After this has been done for each respective axle part, it is necessary to insert some means for preventing further axial movement of the axles to maintain them and their respectively captured C-clips in the desired position.

Accommodation for C-clip assembly requires that sufficient space be available within the differential housing to permit the insertion and attachment of the C-clips to the axle ends, and this space requirement has traditionally been met with existing higher-bias parallel-axis designs by the removal of at least one set of the differential's planetary gear pairs. Known designs of parallel-axis differentials cannot afford to lose such a gear set. That is, the loss of such planetary gearing reduces the differential's available torque capacity below the levels specified for its appropriately practical torque-proportioning use.

Of course, known designs could be significantly enlarged to provide the space requirements of C-clip assembly between existing planetary gear sets, but such enlargement would not be acceptable to the automotive industry which places high priority on space and weight reduction.

Recently, the assignee of this invention has designed several new parallel-axis differentials with gear arrangements adaptable for C-clip assembly. (See U.S. Pat. No. 5,292,291 to S. E. Ostertag; U.S. Pat. No. 5,389,048 to L. E. Carlson; and my application Ser. No. 327,027, identified above). In these designs, C-clip assembly is facilitated by spacing the side gears apart along their common axis and by extending the length of straddle-type planet gears. In the differentials disclosed in the Ostertag patent and in my application Ser. No. 327,027, three pairs of planet gears are positioned at 120° intervals around the common side gear axis.

In contrast, the Carlson patent provides clearance for C-clip assembly directly through the differential housing by organizing the planet gears in two sets of three or four planet gears, the sets being positioned 180° apart about the common axis of the differential. In this latter reference, the planet gears of each set are in triplet or quadruplet meshing arrangements, each set having two outer planet gears in mesh with either a single center planet gear or with two center planet gears that are in mesh with each other. These latter Carlson designs combine accessible space for C-clip assembly with gear trains having torque bias equivalent to well-known differentials utilizing three planet gear pairs or four planet gear pairs positioned in 120° or 90° orientations, respectively.

However, the advantages of the just-described Carlson differential are offset by an uneven load distribution. Namely, each of the center planetary gears (i.e., of each triplet or quadruplet planetary combination) carries twice the load carried by each of the outer planet gears of each combination. Such uneven and excessive loading of the planet gears can result in unsatisfactory noise and wear problems.

My invention overcomes these problems and improves parallel-axis differential design (a) by accommodating C-clip assembly without significant increase in differential size and weight, and/or (b) by providing significant weight reduction and improved lubrication; and it accomplishes these improvements without reducing the differential's torque bias specifications.

SUMMARY OF THE INVENTION

A parallel-axis torque-proportioning differential according to my invention has a generally cylindrical housing for supporting a pair of sun/side gears adapted to receive respective axle ends for rotation about a common axis.

Four sets of planetary gear pairs are mounted within a differential housing having exterior dimensions substantially identical to those presently being used for comparable prior art parallel-axis designs referred to in the Background section above. Further, with this novel configuration, the four planetary sets of my invention have the same number of combination gears (eight) as a typical prior art differential using four planetary sets of paired combination gears. Also, my four planetary sets have the same number of gear meshes and generate the same total thrust forces as do the planetary sets of such a typical prior art device. Therefore, my gear trains exhibit comparable frictional resistance to relative rotation between the drive axles, thereby providing comparable bias ratios, torque capacities, and exterior dimensions in an unconventional format that has important commercial advantages.

In all preferred embodiments of my invention, the planetary pairs are received and supported in the housing by being positioned within a plurality of bores. Also, all of the combination gears in my preferred embodiments are of the recent straddle design (referred to above in the Background section) in order to provide greater control over bias ratio and a more balanced loading of the combination gears. That is, each combination gear meshes with its paired combination gear at two separated areas that straddle the position where each combination gear meshes with its respective sun gear.

More particularly, in all my preferred embodiments, the planet gears have the special design shown in my U.S. patent application Ser. No. 327,027 identified above (the specification of which is incorporated herein by reference). That is, while each of my preferred planet gears conventionally engages one of the differential's side gears at a first meshing portion, its second meshing portion (which is in meshing engagement with its paired planet gear) is divided into three separate engagement areas. These three engagement areas shared by each pair of mating planet gears are separated from each other along each planet gear's respective axis of rotation.

Each planet gear's first and second engagement areas straddle the first meshing portion (that is shared with its respective side gear), while its second and third engagement areas straddle the space where its paired planet gear is in mesh with the differential's other side gear. In each planetary pair, the first engagement area of one planet gear meshes with the third engagement area of its mating planet gear, while the second engagement areas of both gears are in mesh with each other. The second and third engagement areas of each planet gear are preferably separated by a stem having an outer diameter that is smaller than the outer diameter of the second and third engagement areas. These separating stems provide clearance for the side gear that is in mesh with its paired planet gear.

In preferred embodiments, the first and second engagement areas of each planet gear are contiguous with its first meshing portion that engages its associated side gear. Also, as just stated, the first and second engagement areas of each planet straddle its portion of meshing engagement with its respective side gear. Thus, the side gears are spaced apart along their respective common axis through a distance that encompasses the effective face width of the meshing second engagement areas of the planet gears. As will be discussed in greater detail below, this spacing can be designed to provide appropriate clearance between the side gears to accommodate the assembly of C-clip axle retainers.

The three engagement areas reduce tooth loading in the meshing portions shared by each planet gear pair and also provide additional bearing surfaces for better distributing gear mounting loads within the gear supporting pockets of the housing.

My four planetary sets are organized as four separate and distinct meshing pairs that are positioned circumferentially and symmetrically in the housing about the common axis of the side gears. However, my planetary sets are not positioned equiangularly about the common axis. Instead, they are arranged about the common axis in two separated sets, with each planetary set comprising two of the separate and distinct planet gear pairs.

Within each set, the two planetary pairs are separated from each other by a first angular spacing that is the same angle in each set. However, the two planetary sets are separated from each other by respective second angular spacings. The second angular spacings (between the two planetary sets) are also equal in size, but they are each a substantially larger angle than the first angular spacing between the planetary pairs within each set. Therefore, the four pairs of planet gears are distributed symmetrically-but-non-equiangularly about the common axis, and the two separated planet gear sets are arranged in a mirror-image relationship relative to each other.

In all preferred embodiment, the second angular spacings separating the two planetary sets are of sufficient size to permit the use of large windows in the housing that provide access to interior spaces of the differential. Such large windows, which are positioned in circumferential alignment with each of said second angular spacings, facilitate lubrication and also, in combination with the axial separation of the side gears referred to above, provide appropriate access to accommodate C-clip assembly. Further, these commercially valuable features are provided without the disadvantages of prior art designs enumerated above.

Namely, the symmetrical-but-non-equiangular arrangement of my invention provides the following important advantages:

(1) Sufficient space is provided within the differential housing to facilitate assembly of C-clip axle retainers;

(2) Four planetary gear pairs provide increased torque capacity within the same sized housing (i.e., compared to prior art differentials in which only three planetary pairs can be used when accommodating a large window for C-clip access);

(3) The radial loading on each side gear is balanced about its axis of rotation;

(4) The load is equally distributed between all of the planet-to-side-gear meshes; and, further, (5) The arrangement of the four planetary pairs permits the option of arranging the pairs with alternate helix angle orientations (a right hand/left hand pair followed by a left hand/right hand pair, etc.) to achieve symmetry of torque bias between left and right turns of the vehicle.

DRAWINGS

FIGS. 1 and 2 are respective cross-sectional views of a torque-proportioning differential according to a preferred embodiment of the invention in which inner ends of output drive shafts are trapped within the differential by C-clips and a spacer block is positioned between the side gears, FIG. 1 being taken along the line 1—1 of FIG. 2, while FIG. 2 is taken along the line 2—2 of FIG. 1.

Figure 4:
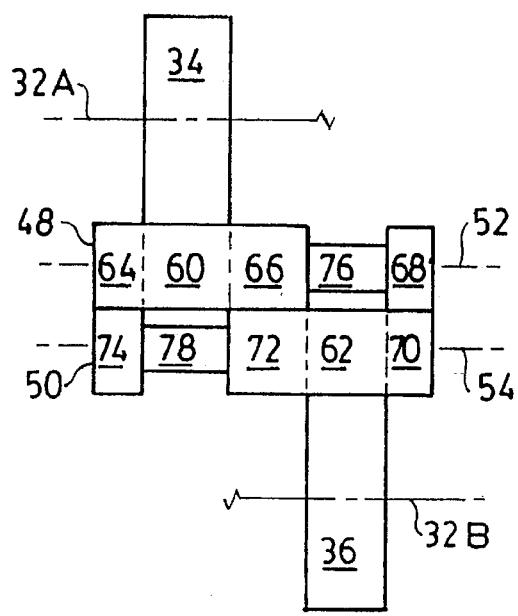
FIG. 4 is a diagrammatic representation of the planetary gearing arrangement shown in FIGS. 1 and 2 with the individual gears rotated in mesh out of their mounting positions into a common axial plane.
Figure 5:
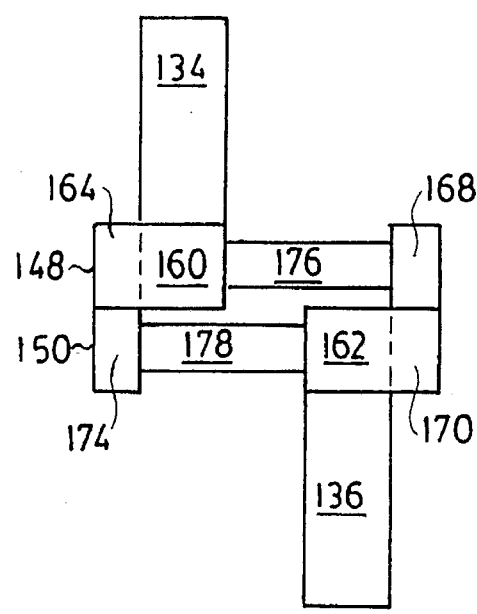
Figure 6:
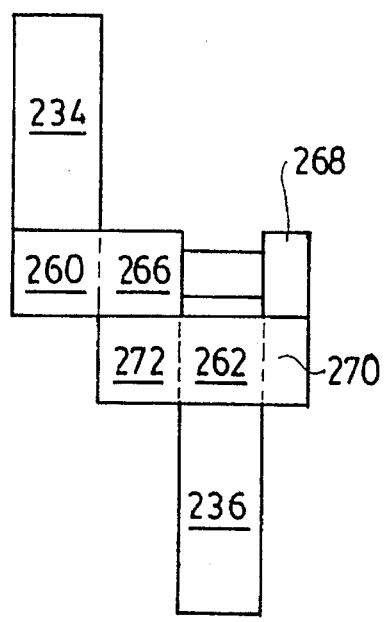
Figure 7:
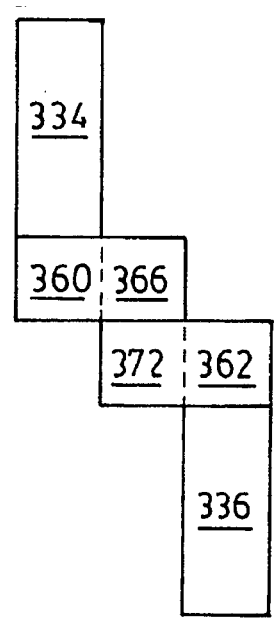

FIGS. 5, 6, and 7 are diagrammatic representations of three alternative types of planetary gear pairs in gearing arrangements that could be used for the practice of my invention, the gear arrangements being represented in the same manner as that used in FIG. 4, namely, with the individual gears rotated in mesh into a common axial plane.

Figure 8:
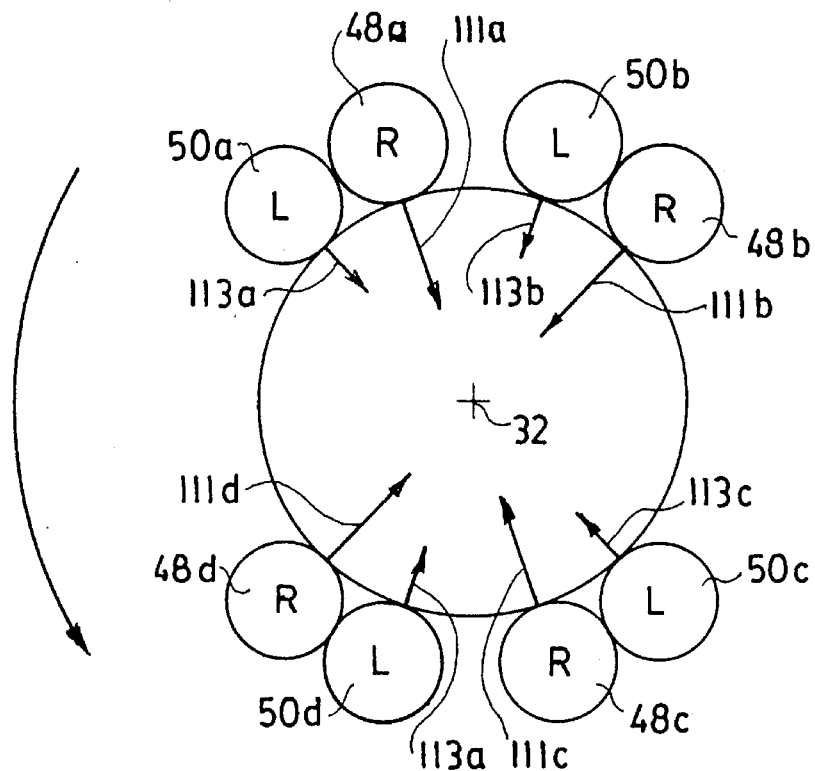
Figure 9:
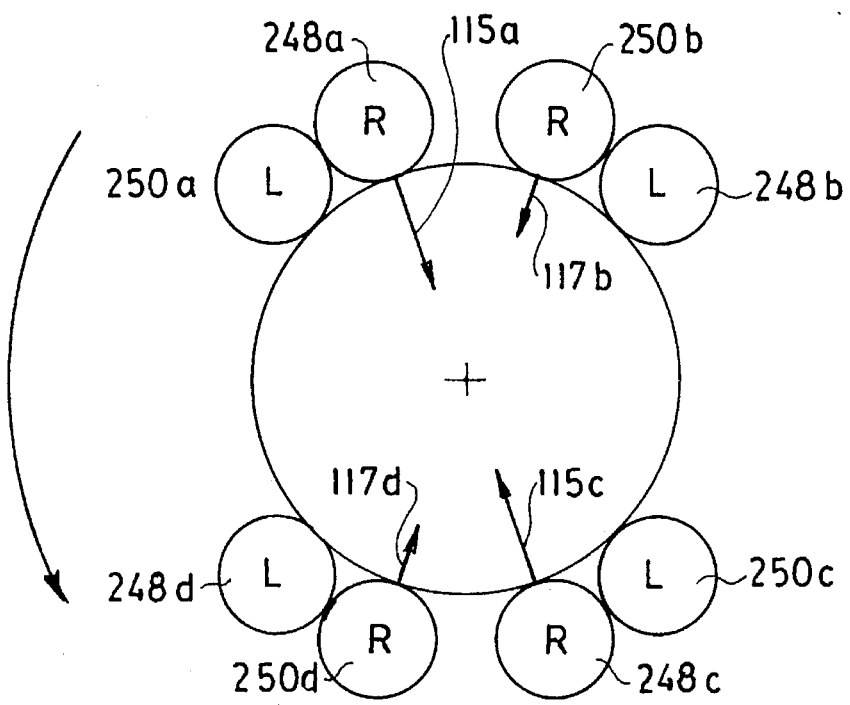

FIGS. 8 and 9 are schematic diagrams of planetary gear arrangements according to my invention, showing two different organizations for the helix angles of the planet gear pairs.

DETAILED DESCRIPTION

Figure 1:
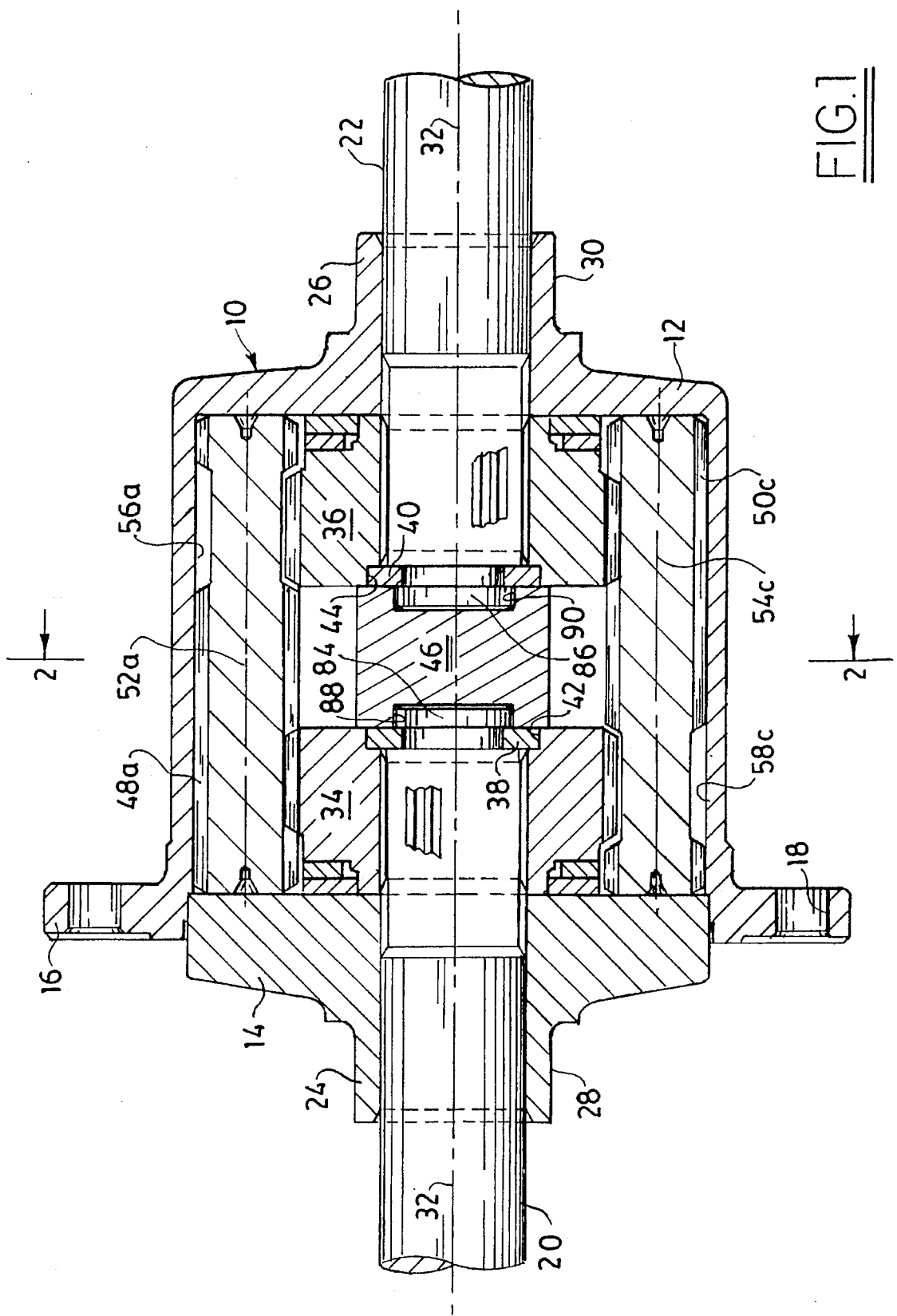
Figure 2:
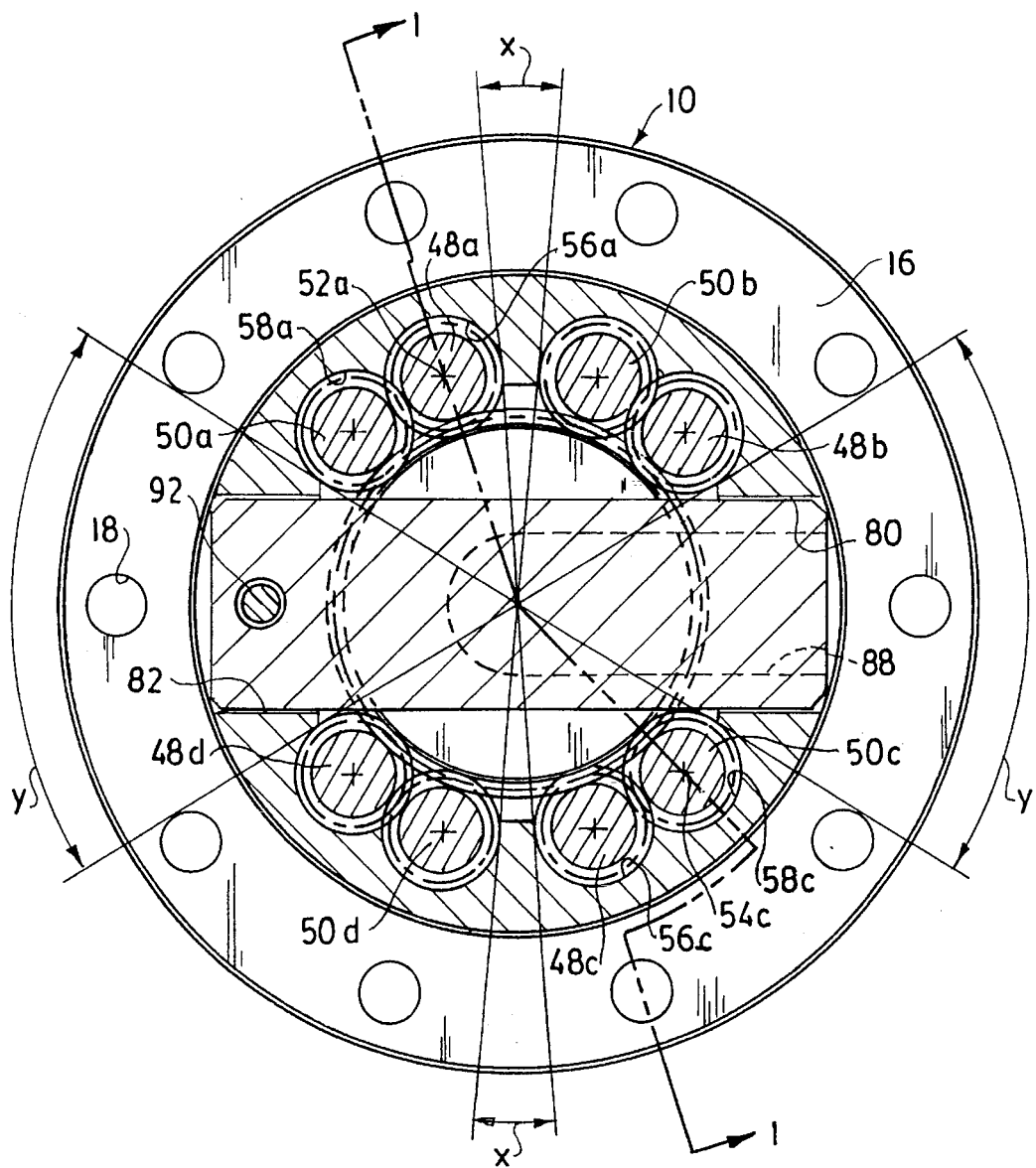
Figure 3:
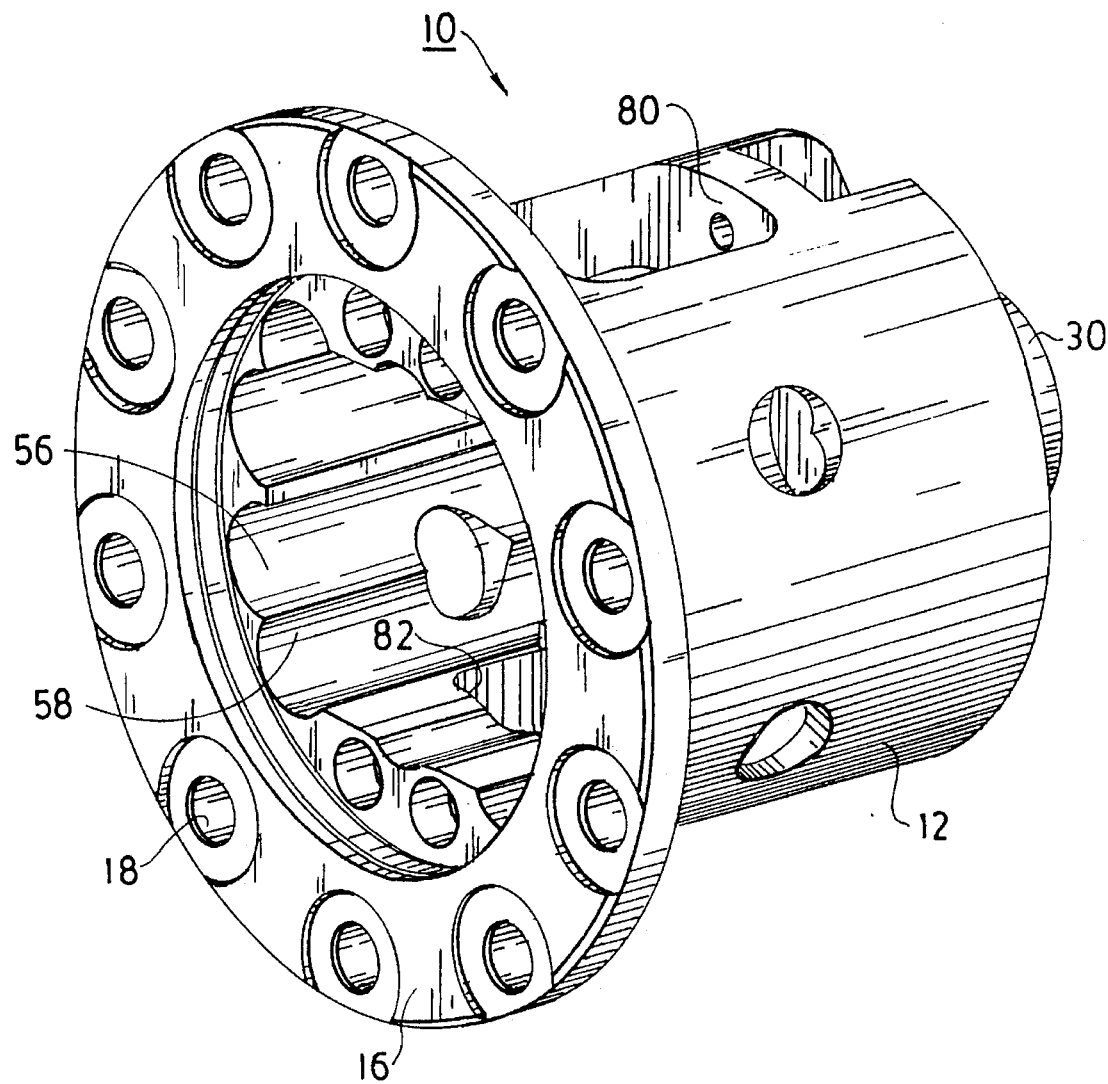
FIG. 3 is an isometric exterior view of the housing of the differential as shown in FIG. 1, the planetary gearing arrangement being omitted.

The preferred embodiment of my new differential illustrated in FIGS. 1, 2, and 3 has a housing 10 that includes a main body 12 and an end cap 14. Bolts (not shown) attach end cap 14 to main body 12. A flange 16 is provided with holes 18 to attach a ring gear (not shown) for transmitting drive power to housing 10. A pair of output drive shafts 20 and 22 are received through trunnions 24 and 26 at opposite ends of housing 10. Trunnions 24 and 26 have journals 28 and 30 for rotating housing 10 within a vehicle chassis (not shown) about the common axis 32 of output shafts 20 and 22.

The inner ends of the output shafts 20 and 22 are splined to respective first and second side gears 34 and 36. In addition, removable locking elements, which are formed as C-clip washers 38 and 40, capture the inner ends of output shafts 20 and 22 within side gear recesses 42 and 44. A spacer block 46, positioned between side gears 34 and 36, further restricts axial movement of the inner ends of output shafts 20 and 22.

Side gears 34 and 36 are interconnected by four pairs of planet gears 48a, 50a; 48b, 50b; 48c, 50c; and 48d, 50d that are rotatable about respective axes that extend parallel to common axis 32, two of these respective axes being identified in FIG. 1 by reference numerals 52a and 54c. The outer diameter surfaces of the planet gears are rotatably supported by respective bearing surfaces that are formed as pockets in main body 12, two of these respective bearing surfaces being identified in FIG. 1 by reference numerals 56a and 58c.

A layout of one of the pairs of planet gears 48 and 50 in mesh with the side gears 34 and 36 is shown in FIG. 4. In the view of FIG. 4, common axis 32 has been split into two halves 32A and 32B to enable the side gears 34 and 36 to be rotated in mesh with the planet gears 48 and 50 into a common axial plane.

It can be seen that each planet gear 48, 50 is in mesh with a respective one of the side gears 34, 36 as well as with its paired planet gear. In the preferred embodiment disclosed in FIGS. 1, 2, and 4, each planet gear 48 has a first meshing portion 60 that is in mesh with side gear 34, while its paired planet gear 50 has a first meshing portion 62 that is in mesh with side gear 36. Planet gears 48, 50 each have a second meshing portion with which they engage each other. Namely, the second meshing portion of planet gear 48 is comprised of three separate engagement areas 64, 66, and 68, while the second meshing portion of planet gear 50 is divided into three separate engagement areas 70, 72, and 74. First engagement area 64 of planet gear 48 is in engagement with third engagement area 74 of planet gear 50, while first engagement area 70 of planet gear 50 is in mesh with third engagement area 68 of planet gear 48. The respective second engagement areas 66, 72 of the planet gears are in mesh with each other. Further, the first and second engagement areas 64, 66; 70, 72 are contiguous with the respective first meshing portion 60, 62 of each planet gear, while second and third engagement areas 66, 68; 72, 74 are separated by respective stem portions 76, 78, which are formed with smaller diameters than are the adjacent meshing portions to prevent interference with respective side gears 36 and 34.

First and second engagement portions 64, 66 of planet gear 48 are separated by its first meshing portion 60, while first and second engagement areas 70, 72 of planet gear 50 are separated by its first meshing portion 62. Therefore, paired planet gears 48 and 50 share three separate and distinct engagement areas separated along their respective axes. Meshing engagement areas 64, 74; 66, 72 straddle side gear 34, while meshing engagement areas 66, 72; 68, 70 straddle side gear 36. Further, side gears 34, 36 (which are separated along common axis 32) straddle meshing engagement areas 66, 72 of the planet gears.

Preferably, side gears 34, 36 are spaced apart along common axis 32 through a distance equivalent to the effective face width of side gear 34. Further, planet gears 48, 50 are preferably designed so that this distance is also equivalent to the effective face width of their shared meshing engagement areas 66, 72 and so that this effective face width is equal to the length of overlap between the mating planet gear teeth in an axial plane.

Second engagement areas 66, 72 increase the total amount of effective face width shared by planet gears 48, 50. This reduces the amount of stress that would otherwise be present at the two other shared engagement areas 64, 74; 68, 70. Also, the outer diameter surfaces of second engagement areas 66, 72 provide additional journal support against the housing pocket bearing surfaces in which the respective planet gears are mounted, thereby reducing planet gear mounting stresses within housing 10.

As can best be seen from FIG. 2, four sets of paired planet gears 48a, 50a; 48b, 50b; 48c, 50c; and 48d, 50d are distributed symmetrically, but non-equiangularly, about common axis 32. The planet gear pairs are organized in two separate sets which, for purposes of explanation, shall be designated as upper set 48a, 50a; 48b, 50b and as lower set 48c, 50c; 48d, 50d. The planet pairs within each set are separated by a first angular spacing x, while the upper and lower sets are separated from each other by a second angular spacing y. Preferably, first angular spacing x are relatively minimal distances sufficient to provide the necessary mechanical separation between the planet pairs of each set, while second angular spacings y are substantially larger than first angular spacings x. As indicated above, spacing y separate the upper and lower sets of planet gears sufficiently to permit ready access to the interior of the differential, such larger spacing being, preferably, at least a distance larger than the outer diameter of a planet gear. In this preferred embodiment, angular spacings y are made large enough to permit windows 80 and 82 to be formed in main body 12 of sufficient size to readily facilitate assembly of C-clip washers 38, 40 to the respective ends of output drive shafts 20, 22. Windows 80, 82 are positioned in circumferential alignment with each said angular spacing y.

Windows 80, 82 also receive and support spacer block 46 when it is inserted between the respective ends 84, 86 of output drive shafts 20, 22 and between the opposed end faces of spaced side gears 34, 36. Appropriate recesses 88, 90 are formed in spacer block 46 to receive shaft ends 84, 86, thereby permitting spacer block 46 to contact the opposed end faces of spaced side gears 34, 36 as well as shaft ends 84, 86. A retainer pin 92 is used to secure spacer block 46 in main body 12 of housing 10.

This symmetrical-but-non-equiangular arrangement of the planet pairs not only facilitates C-clip assembly but also provides the many other advantages listed above. Further, this symmetrical-but-non-equiangular arrangement is similarly advantageous when used with other conventional types of planet gearing. In FIG. 5, side gears 134, 136 are interconnected by a slightly different design of "straddle" type planet gears 148, 150. Each of these straddle planet gears has a respective first meshing portion 160, 162 which engages a respective one of the side gears, and each shares a second meshing portion with the other paired planet gear. However, in this design this second meshing portion comprises, respectively, first and second engagement areas 164, 168 and 170, 174 that (a) straddle the first meshing portion and (b) are separated, respectively, by narrowed stem portions 176, 178.

FIG. 6 shows a further embodiment in which side gears 234, 236 are interconnected by planet gear pairs having first meshing portions 260, 262 while sharing respective second meshing portions comprising separated engagement areas 266, 268 and 270, 272.

In still another possible embodiment shown in FIG. 7, side gears 334, 336 are interconnected by a pair of conventional planet gears having first meshing areas 360, 362, the planets being in mesh with each other at their shared second meshing portions 366, 372.

In each of these illustrated embodiments, four full pairs of planetary gears are used so that there is no sacrifice of torque capacity even though C-clip assembly is facilitated. Of course, my symmetrical-but-non-equiangular arrangement can also be used in differential designs in which the axle ends are not secured by C-clips and where the side gears are not necessarily spaced apart along their common axis. In such cases, my invention still provides space for large windows 80, 82 to be formed in the housing's main body 12, thereby permitting a significant reduction in the weight of the differential and also greatly facilitating lubrication.

However, in addition to the advantages just described in the previous paragraph, the distributed planet gears of my invention also assure that the forces acting between the planet gears and their respective side gears will remain balanced at all times. In this regard, reference is made to FIG. 8 which schematically represents the planetary arrangement of FIG. 2, with the respective left- and right-hand direction of the helix angles of the planet gears being indicated by the respective letters "L" and "R". In this arrangement, the hand of the helical teeth of the planet gears is selected so that the hand of each respective planet gear is opposite to the hand of the planet gears positioned on either side of it when viewed circumferentially about the common axis.

It is well known that the forces acting on the individual planet gears of each planet gear pair are not equal. For instance, if it is assumed that under forward drive conditions the differential housing is rotated in a counter-clockwise direction (as indicated by the arrow), each left-hand planet gear L is "leading" in the direction of rotation, while each right-hand planet gear R is "trailing"; and, therefore, as is understood by those skilled in the art, the radial and frictional forces acting on each trailing gear R are larger than the similar forces acting on its paired leading planet gear L.

Nonetheless, because the gear pairs are arranged symmetrically, the radial load distribution on each side gear remains balanced. This load distribution is symbolically represented in FIG. 8 by the use of arrows representing radial vectors sized to indicate the radial loads being transferred between each planet gear and its respective side gear. All of the right-hand helical planet gears R are in mesh with side gear 34; and the load 111a transferred between side gear 34 and trailing planet gear 48a is directly opposed and balanced by the similar load 111c being transferred between side gear 34 and trailing planet gear 48c (which is positioned 180° from planet gear 48a), while the load 111b transferred between side gear 34 and trailing planet gear 48b is directly opposed and balanced by the similar load 111d being transferred between side gear 34 and trailing planet gear 48d. Similarly, all of the left-hand helical planet gears L are in mesh with side gear 36, and the radial loads 113a, 113b transferred between side gear 36 and leading planet gears 50a, 50b are directly opposed and balanced by the similar radial loads 113c, 113d being transferred between side gear 36 and leading planet gears 50c, 50d.

It will be noted that, in the planetary arrangement shown in FIG. 8, all of the leading planet gears L are in mesh with side gear 36, while all of the trailing planet gears R are in mesh with side gear 34. Therefore, since the frictional forces acting on the trailing gears are substantially larger than those on the leading gears, the accumulation of these forces on the respective side gears may result in noticeable differences in the torque bias ratios experienced, respectively, during left and right turns by the vehicle. Therefore, to minimize such undesirable imbalance conditions, in some instances it has proven desirable to balance the accumulated leading and trailing planet-gear frictional forces. This is accomplished by modifying the helix angles of the leading and trailing planet gears so that each side gear is in mesh with equal numbers of leading and trailing planet gears.

FIG. 9 shows a planetary arrangement modified in the manner just suggested above. The leading planet gear of each planetary pair has a helix angle opposite to the helix angle of the leading planet gear of the preceding planet pair; or, viewed in terms of the separated sets of planet gears, the hand of the helical teeth of the planet gears are selected so that the two respective planet gears that are separated by the first angular spacing in both of the separated sets all have helical teeth of the same hand. That is, leading planet gear 250b has right-hand helical teeth, while the leading planet gear 250a of the preceding pair has left-hand helical teeth. With this arrangement, each side gear is in mesh with two leading planet gears (e.g., 250a and 250c) and with two trailing planet gears (e.g., 248b and 248d). Once again, attention is called to the fact that, in spite of the non-equiangular arrangement of my invention, its symmetry results in balanced forces acting on the side gears. Even with the arrangement shown in FIG. 9, in which two of the four planet gears meshing with each side gear may be acting under forces substantially different from the forces acting on the other two planet gears, the radial load distribution on each side gear remains balanced. For instance, the load 115a transferred between trailing planet gear 248a and its related side gear is directly opposed and balanced by the similar load 115c being transferred between this same side gear and trailing planet gear 248c, while the load 117b transferred between leading planet gear 250b is directly opposed and balanced by the similar load 117d being transferred between the side gear and leading planet gear 250d.

Thus, the symmetrical-but-non-equiangular planetary system of my differential can be used with all types of planetary gearing. It provides balanced loading on the side gears. It facilitates C-clip assembly. It increases gearing lubrication. It reduces the overall weight of the differential. These advantages are achieved without increasing the outside dimensions of the differential and without sacrificing torque capacity.

I claim:

1. In a parallel-axis gear differential for interconnecting a pair of drive axles which share a common axis of rotation, said differential having:

a housing rotatable about said pair of drive axles;

a pair of cylindrical side gears positioned in said housing for receiving ends of the respective drive axles for rotation therewith about the common axis, each said side gear having an outer diameter and an effective face width;

a plurality of cylindrical planet gears organized in meshing pairs and positioned circumferentially in said housing about said common axis for rotation about respective axes extending parallel to the common axis; and each of said planet gears including a first meshing portion in engagement with the effective face width of one of said side gears and a second meshing portion in engagement with a respective meshing portion of its paired planet gear, the meshing portions of each said planet gear having an outer diameter and the meshing engagement of said side and planet gears interconnecting said respective axle ends in a mutual driving and load-transmitting relationship;

the improvement wherein:

four separate and distinct pairs of said planet gears are symmetrically arranged about the common axis in two separated sets, with two planet gear pairs being positioned in each set, and with the axes of all of said planet gears located at the same radial distance from the common axis;

said two pairs of planet gears in each said set are circumferentially separated from each other by respective first angular spacings;

said two sets of planet gears are separated from each other by respective second angular spacings;

said housing has at least one window for providing access to space interior of said differential, said window being positioned in circumferential alignment with at least one of said second angular spacings; and said second angular spacings are substantially larger than said first angular spacings so that said four pairs of planet gears are distributed symmetrically-but-not-equiangularly about the common axis and said two sets of planet gears are separated by a distance larger than said outer diameter of one of said planet gears to permit access through said window to said space interior of said differential.

2. The differential of claim 1 wherein said side gears are spaced apart along the common axis through a distance that is approximately equivalent to said effective face width of one of said side gears.

3. The differential of claim 2 wherein said second meshing portion of each planet gear of at least one pair in each said set of planet gears is separated into first, second, and third engagement areas.

4. The differential of claim 3 wherein said first and second engagement areas of said planet gear straddle the first meshing portion of said planet gear and said second and third engagement areas straddle the first meshing portion of said paired planet gear.

5. The differential of claim 4 wherein said first and second engagement areas of said planet gear are contiguous with the first meshing portion of said planet gear.

6. The differential of claim 4 wherein said second and third engagement areas are interconnected by a stem having an outer diameter that is smaller than said outer diameter of said second and third engagement areas of said planet gear.

7. The differential of claim 1 wherein said second meshing portion of one planet gear in at least one pair in each said set of planet gears is separated into two engagement areas which straddle the position where the other planet gear of the same pair meshes with its respective side gear.

8. The differential of claim 1 wherein each planet gear in at least one pair in each said set of planet gears is separated into two engagement areas which straddle the position where the other planet gear of the same pair meshes with its respective side gear.

9. The differential of claim 8 wherein said two engagement areas are interconnected by a stem having an outer diameter that is smaller than said outer diameter of said meshing portions of said planet gear.

10. The differential of claim 8 wherein one of said two engagement areas is contiguous with said first meshing portion where said planet gear is in mesh with its respective side gear.

11. The differential of claim 1 wherein said side and planet gears are helical gears, and wherein the design and hand of the helical teeth of said pairs of planet gears are selected so that said two separated planet gear sets are arranged in a mirror-image relationship relative to each other.

12. The differential of claim 11 wherein the design and hand of the helical teeth of said pairs of planet gears are selected so that the radial load transmitted between each said side gear and the planet gears meshing with it is distributed equally between said side gear and each said planet gear.

13. The differential of claim 11 wherein the design and hand of the helical teeth of said pairs of planet gears are selected so that the radial load transmitted between each said side gear and the planet gears meshing with it is balanced about said common axis.

14. The differential of claim 11 wherein the design and hand of the helical teeth of said pairs of planet gears are selected so that the two respective planet gears that are separated by said first angular spacing in both of said separated sets all have helical teeth of the same hand.

15. The differential of claim 1 wherein said side and planet gears are helical gears, and wherein the design and hand of the helical teeth of said pairs of planet gears are selected so that the hand of each respective planet gear is opposite to the hand of the planet gears positioned on either side of it when viewed circumferentially about the common axis.

16. The differential of claim 1 further comprising an axle-separating thrust plate positioned between said spaced side gears.

17. The differential of claim 16 wherein said housing has a window positioned in circumferential alignment with each of said second angular spacings, and wherein said axle-separating thrust plate is received within and is supported by said windows.

18. The differential of claim 1 wherein said respective first angular spacings are relatively minimal distances sufficient to provide mechanical separation between said planet pairs of each set.

19. In a parallel-axis gear differential for accommodating a pair of drive axles which share a common axis of rotation and which require C-clip assembly, said differential having:

a housing rotatable about said pair of drive axles;

a pair of cylindrical side gears positioned in said housing for receiving ends of the respective drive axles for rotation therewith about the common axis;

a plurality of cylindrical planet gears organized in meshing pairs and positioned circumferentially in said housing about said common axis for rotation about respective axes extending parallel to the common axis; and each of said planet gears including a first meshing portion in engagement with one of said side gears and a second meshing portion in engagement with a respective meshing portion of its paired planet gear, the meshing engagement of said side and planet gears interconnecting said respective axle ends in a mutual driving and load-transmitting relationship;

the improvement wherein:

four separate and distinct pairs of said planet gears are symmetrically arranged about the common axis in two separated sets, with two planet gear pairs being positioned in each set, and with the axes of all of said planet gears located at the same radial distance from the common axis;

said two pairs of planet gears in each said set are circumferentially separated from each other by respective first angular spacings;

said two sets of planet gears are separated from each other by respective second angular spacings;

said housing has at least one window for permitting assembly of said C-clips, said window being positioned in circumferential alignment with at least one of said second angular spacings; and said second angular spacings are substantially larger than said first angular spacings so that said four pairs of planet gears are distributed symmetrically-but-not-equiangularly about the common axis and said two sets of planet gears are separated by a distance sufficient to provide appropriate access through said window to said side gears and to said axles to accommodate said C-clip assembly.

* * * * *